United States Patent
Xie et al.

(10) Patent No.: US 12,213,168 B2
(45) Date of Patent: Jan. 28, 2025

(54) INFORMATION RECORDING AND REPORTING METHOD AND APPARATUS

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Fang Xie, Beijing (CN); Guangyi Liu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 282 days.

(21) Appl. No.: 17/639,559

(22) PCT Filed: Sep. 1, 2020

(86) PCT No.: PCT/CN2020/112850
§ 371 (c)(1),
(2) Date: Mar. 1, 2022

(87) PCT Pub. No.: WO2021/043132
PCT Pub. Date: Mar. 11, 2021

(65) Prior Publication Data
US 2022/0338252 A1    Oct. 20, 2022

(30) Foreign Application Priority Data
Sep. 2, 2019 (CN) .......................... 201910823903.2

(51) Int. Cl.
*H04W 8/24* (2009.01)
*H04W 24/10* (2009.01)
(Continued)

(52) U.S. Cl.
CPC ........... *H04W 74/002* (2013.01); *H04W 8/24* (2013.01); *H04W 24/10* (2013.01);
(Continued)

(58) Field of Classification Search
CPC . H04B 7/02–12; H04B 17/0082–3913; H04W 8/22–245; H04W 24/02–10;
(Continued)

(56) References Cited

U.S. PATENT DOCUMENTS 9,491,780 B2   11/2016   Pang et al.
9,949,298 B1   4/2018    Akoum et al.
(Continued)

FOREIGN PATENT DOCUMENTS

CN    101969662 A    2/2011
CN    101990236 A    3/2011
(Continued)

OTHER PUBLICATIONS

Qualcomm Incorporated: "2-step RACH fall back to 4-step RACH", 3GPP Draft; R2-1907910, XP051731327, May 13, 2019, 3 pages.
(Continued)

*Primary Examiner* — Timothy J Weidner
(74) *Attorney, Agent, or Firm* — Cooper Legal Group, LLC

(57) ABSTRACT

The present invention provides an information record reporting method and apparatus. The information record reporting method is applied to a network side device, and comprises: sending a random access related information record instruction to a terminal, the random access related information
(Continued)

---

Random access related information is recorded ⟶ 201

The random access related information is reported to the network-side device ⟶ 202 record instruction instructing the terminal to record random access related information.

12 Claims, 8 Drawing Sheets

(51) Int. Cl.
　　　H04W 72/044　　　(2023.01)
　　　H04W 74/00　　　(2009.01)
　　　H04W 74/08　　　(2024.01)
　　　H04W 74/0833　　(2024.01)
　　　H04W 84/02　　　(2009.01)
　　　H04W 88/02　　　(2009.01)
　　　H04W 88/08　　　(2009.01)
　　　H04W 88/18　　　(2009.01)
　　　H04W 92/02　　　(2009.01)
　　　H04W 92/10　　　(2009.01)

(52) U.S. Cl.
　　　CPC ....... *H04W 72/046* (2013.01); *H04W 74/085* (2013.01); *H04W 74/0866* (2013.01); *H04W 84/02* (2013.01); *H04W 88/02* (2013.01); *H04W 88/08* (2013.01); *H04W 88/18* (2013.01); *H04W 92/02* (2013.01); *H04W 92/10* (2013.01)

(58) Field of Classification Search
　　　CPC ......... H04W 36/0005–385; H04W 72/02–569; H04W 74/002–0891; H04W 76/10–50; H04W 84/02–16; H04W 88/005–188; H04W 92/02–24
　　　See application file for complete search history.

(56) References Cited

U.S. PATENT DOCUMENTS

| | | | |
|---|---|---|---|
| 11,895,509 B2 | 2/2024 | Xie | |
| 2014/0023032 A1 | 1/2014 | Kim | |
| 2014/0241285 A1* | 8/2014 | Pang | H04W 74/0833 |
| 2019/0053271 A1 | 2/2019 | Islam | |
| 2019/0132882 A1 | 5/2019 | Li | |
| 2019/0350005 A1 | 11/2019 | Liu | |
| 2019/0357267 A1 | 11/2019 | Martin et al. | |
| 2019/0380071 A1 | 12/2019 | Liu | |
| 2020/0008244 A1 | 1/2020 | Suzuki | |
| 2020/0229244 A1 | 7/2020 | Yan | |
| 2021/0345199 A1 | 11/2021 | Liu | |
| 2021/0378028 A1* | 12/2021 | Wu | H04W 74/0833 |
| 2022/0007429 A1 | 1/2022 | Martin et al. | |
| 2022/0022267 A1* | 1/2022 | Shi | H04W 74/0833 |
| 2022/0132578 A1* | 4/2022 | Da Silva | H04W 74/0833 |
| 2022/0217781 A1 | 7/2022 | Decarreau et al. | |
| 2023/0052766 A1 | 2/2023 | Choe et al. | |
| 2023/0084632 A1* | 3/2023 | Xie | H04W 74/0833 |
| 2023/0239930 A1* | 7/2023 | Xie | H04W 74/0833 |
| 2023/0328803 A1 | 10/2023 | Parichehrehteroujeni et al. | |

FOREIGN PATENT DOCUMENTS

| | | | | |
|---|---|---|---|---|
| CN | 102843706 A | * | 12/2012 | ........ H04W 74/0833 |
| CN | 103096355 A | | 5/2013 | |
| CN | 101784122 B | | 3/2014 | |
| CN | 104581983 A | | 4/2015 | |
| CN | 103096355 B | | 11/2015 | |
| CN | 108702698 A | | 10/2018 | |
| CN | 109246831 A | | 1/2019 | |
| CN | 109286942 A | | 1/2019 | |
| CN | 109600783 A | | 4/2019 | |
| CN | 109863814 A | | 6/2019 | |
| CN | 109983829 A | | 7/2019 | |
| CN | 110169189 A | | 8/2019 | |
| CN | 110192426 A | | 8/2019 | |
| CN | 110753324 A | | 2/2020 | |
| CN | 110798844 A | | 2/2020 | |
| CN | 111436159 A | | 7/2020 | |
| CN | 111819905 A | | 10/2020 | |
| CN | 112449386 A | | 3/2021 | |
| EP | 2698932 B1 | | 8/2017 | |
| EP | 3579649 B1 | | 9/2021 | |
| JP | 2015146645 A | | 8/2015 | |
| JP | 2022520389 A | | 3/2022 | |
| KR | 20190118626 A | | 10/2019 | |
| WO | 2012141483 A2 | | 10/2012 | |
| WO | 2018126417 A1 | | 7/2018 | |
| WO | 2018127549 A1 | | 7/2018 | |
| WO | 2018157298 A1 | | 9/2018 | |
| WO | 2019024545 A1 | | 2/2019 | |
| WO | 2019228298 A1 | | 12/2019 | |
| WO | 2020052550 A1 | | 3/2020 | |
| WO | 2020164535 A1 | | 8/2020 | |

OTHER PUBLICATIONS

Ericsson: "RACH report contents in NR Option 1", 3GPP Draft; R2-1910843, XP051768610, Aug. 15, 2019, 7 pages.
Supplementary Partial European Search Report in the European application No. 20861086.5, mailed on Sep. 12, 2022, 18 pages.
International Search Report in the international application No. PCT/CN2020/112850, mailed on Dec. 9, 2020, 2 pgs.
English translation of the Written Opinion of the International Search Authority in the international application No. PCT/CN2020/112850, mailed on Dec. 9, 2020, 3 pgs.
"Medium Access Control (MAC) Protocol Specification" (Release 15), Jun. 2019, 3GPP. 3rd Generation Partnership Project; Technical Specification Group Radio Access Network; NR; 3GPP TS 38.321 VJ 5.6.0, 77 pgs.
"Procedures for Two-Step RACH", May 2019, Source: Qualcom Incorporated, R1-1907256, 3GPP TSG-RAN WG1 Meeting #97, 14 pgs.
"On Reporting Random Access-related Information", Aug. 2019, 3GPP TSG-RAN WG2 Meeting #107, R2-1909210, Prague, Czech Republic, Source: Samsung, 3 pgs.
"On the Use Cases and Required F1 Signaling for RACH Optimization at gNB-DU", Aug. 2019, Source: Ericsson; 3GPP TSG RAN WG3 #105, R3-194291, Ljubijana, SI, 5 pages.
"Fallbacks in two-step RACH", Aug. 2019, 3GPP TSG-RAN WG2 Meeting 107; R2-1910683, Retrieved from the Internet: URL: http://www.3gpp.org/ftp/tsg_ran/WG2_RL2/TSGR2_107/Docs/R2-1910683.zip>, Source: Huawei, HiSilicon, Prague, Czech Republic, 6 pgs.
Supplementary European Search Report in the European application No. 20861086.5, mailed on Dec. 19, 2022, 19 pgs.
Third Office Action of the European application No. 20861086.5, issued on Jun. 17, 2024. 5 pages.
International Search Report in the international application No. PCT/CN2021/073117, mailed on Apr. 21, 2021. 5 pages with English translation.
Written Opinion of the International Search Authority in the international application No. PCT/CN2021/073117, mailed on Apr. 21, 2021. 9 pages with English translation.
Supplementary European Search Report in the European application No. 21750180.8, mailed on Jan. 5, 2023. 6 pages.
Ericsson, "Open issues related to RACH Report", 3GPP TSG RAN WG2 #108 R2-1915433, Oct. 18-Nov. 22, 2019, p. 1-9, 10 pages.
SAMSUNG: "Further Logged Information in NR MDT", 3GPP Draft; R2-1916095, 3rd Generation Partnership Project (3GPP), Mobile Competence Centre ; 650, Route Des Lucioles ; F-06921 Sophia-Antipolis Cedex ; France vol. RAN WG2, no. Reno, USA; Nov. 18, 2019-Nov. 22, 2019, Nov. 18-22, 2019, XP051817644, the whole document, 7 pages.
3GPP TSG-RAN WG2 Meeting #108 R2-1915889, Reno, USA, Nov. 18-22, 2019, Title: Stage-2 running CR for 2-step RACH, Source to WG: Nokia (rapporteur), Nokia Shanghai Bell. the whole document. 8 pages.

(56) References Cited

OTHER PUBLICATIONS

International Search Report in the international application No. PCT/CN2021/101339, mailed on Sep. 9, 2021. 6 pages with English translation.
Written Opinion of the International Search Authority in the international application No. PCT/CN2021/101339, mailed on Sep. 10, 2021. 11 pages with English translation.
"3GPP TS 38.321 V16.0.0 (Mar. 2020), 3rd Generation Partnership Project; Technical Specification Group Radio Access Network, NR; Medium Access Control (MAC) protocol specification (Release 16)", the whole document. 140 pages.
ZTE Corporation et al: "Further considerations on RACH optimization", 3GPP Draft; R2-2000805, 3rd Generation Partnership Project (3GPP), Mobile Competence Centre; 650, Route Des Lucioles; F-06921 Sophia-Antipolis Cedex; France, vol. RAN WG2, no. Electronic meeting; Feb. 24, 2020-Mar. 6, 2020 Feb. 14, 2020 (Feb. 14, 2020), XP051849335, Section 2. 7 pages.
Supplementary Partial European Search Report in the European application No. 21826467.9, mailed on Oct. 20, 2023. 18 pages.
3GPP TSG-RAN WG2 #110e R2-2004733, Electronic meeting, Jun. 1-Jun. 11, 2020, Agenda Item: 6.12.4, Source: Ericsson, Title: Clarification to RA-report purposes, Document for: Discussion, Decision. the whole document. 12 pages.
CATT, "Corrections for the Content of RACH Records"3GPP TSG RAN WG2#109-e, R2-2000106, Electronic meeting, Feb. 24--Mar. 6, 2020, pp. 1-3, 20 pages.
ZTE Corporation et al., "[Z152] Correction to RACH report and RLF report", 3GPP TSG RAN WG2#109bis-e, R2-2002923, Electronic meeting, Apr. 20-Apr. 30, 2020, the whole document, 19 pages.
CMCC: "2-step RACH optimisation", 3GPP Draft; R3-205437, 3rd Generation Partnership Project (3GPP), Mobile Competence Centre ; 650, Route Des Lucioles ; F-06921 Sophia-Antipolis Cedex ; France vol. RAN WG3, no. Online; Aug. 17, 2020-Aug. 28, 2020 Aug. 7, 2020 (Aug. 7, 2020), XP052398500, Section 2, 4 pages.
Supplementary European Search Report in the European application No. 21826467.9, mailed on Feb. 13, 2024, 22 pages.

* cited by examiner

A random access related information recording instruction is sent to UE, the random access related information recording instruction indicating the UE to record random access related information — 101

FIG. 3

INFORMATION RECORDING AND REPORTING METHOD AND APPARATUS

CROSS-REFERENCE TO RELATED APPLICATION

This application claims priority to Chinese patent application No. 201910823903.2, filed on Sep. 2, 2019, the disclosure of which is hereby incorporated by reference in its entirety.

TECHNICAL FIELD

The disclosure relates to the technical field of wireless communication, and particularly to a method and apparatus for recording and reporting information.

BACKGROUND

For User Equipment (UE) and base station operating in an unlicensed band, a Listen Before Talk (LBT) operation is required before data is sent. If it is detected that a channel is busy, the channel is avoided for some time and then the channel is monitored, and when the channel is kept idle for some time, it may be determined that the channel is idle, and then the data is sent. In order to reduce a delay for random access, steps of a 4-step random access mechanism in a related art may be reduced to two steps. FIG. 1 shows the 4-step random access mechanism in the related art. FIG. 2 shows a 2-step random access mechanism. Therefore, LBT operations are reduced, and the overall random access delay is reduced.

SUMMARY

The disclosure is intended to provide a method and apparatus for recording and reporting information, which may help a network-side device to configure a random access parameter appropriately.

In order to solve the foregoing technical problem, embodiments of the disclosure provide the following technical solutions.

An embodiment of the disclosure provides a method for recording and reporting information, which may be applied to a network-side device and include the following operation.

A random access related information recording instruction is sent to UE. The random access related information recording instruction may instruct the UE to record random access related information. The random access related information may include at least one type of the following information to be recorded and reported:
  a beam Identifier (ID) of message A sent by the UE for 2-step random access;
  a number of messages A of 2-step random access sent by the UE;
  a size of message A sent by the UE, or a size configured by the network-side device to send message A, or a size of another content except a preamble in message A;
  a cause for the UE to switch from 2-step random access to 4-step random access;
  an actual value corresponding to a threshold configured by the network-side device for initiating 2-step random access;
  time elapsed since the UE switching from 2-step random access to 4-step random access;
  the number of attempts of the UE on 2-step random access before switching to 4-step random access, or the maximum number of attempts, configured by the network-side device, of the UE on 2-step random access before the UE backs off to 4-step random access;
  information of a serving cell and neighbor cells measured by the UE when determining that 2-step random access does not succeed or fails;
  information of the serving cell and the neighbor cells measured by the UE when successfully receiving or decoding message B;
  information of the serving cell and the neighbor cells measured by the UE when successfully receiving or decoding message 4;
  information of the serving cell and the neighbor cells measured by the UE when successfully receiving or decoding a Random Access Response (RAR); or
  information of the serving cell and the neighbor cells measured by the UE when successfully receiving or decoding a Radio Resource Control (RRC) message.

Optionally, the random access related information may further include at least one type of the following information to be recorded and reported:
  an ID of the serving cell;
  information of the serving cell measured by the UE when sending the preamble; or
  information of the neighbor cells measured by the UE when sending the preamble.

Optionally, after the operation that a random access related information recording instruction is sent to UE, the method may further include the following operations.

The random access related information reported by the UE is received.

A random access parameter is configured according to the random access related information.

Optionally, before the operation that the random access related information reported by the UE is received, the method may further include the following operation.

A random access related information reporting instruction is sent to the UE. The random access related information reporting instruction may instruct the UE to report the recorded random access related information.

Optionally, the random access related information may further include at least one of geographic position information, time information or speed information corresponding to the information to be recorded and reported.

Optionally, the threshold configured by the network-side device may include at least one of:
  Reference Signal Received Power (RSRP);
  Reference Signal Received Quality (RSRQ); or
  a Signal to Interference plus Noise Ratio (SINR).

Optionally, the information of the serving cell may include at least one of:
  RSRP of the serving cell;
  RSRQ of the serving cell;
  a SINR of the serving cell;
  an ID of a first beam;
  the number of beams with quality higher than a preset threshold value;
  RSRP of the first beam;
  RSRQ of the first beam; or
  a SINR of the first beam.

Optionally, the first beam may be any one of:
  a beam used for message A transmission by the UE or beam corresponding to message A transmission by the UE;

a beam used for the preamble transmission by the UE or beam corresponding to the preamble transmission by the UE;

a beam with quality higher than the preset threshold value, measured by the UE; or all beams measured by the UE.

Optionally, the information of the serving cell measured by the UE may include at least one of:

information of the serving cell measured by the UE when initiating 2-step random access;

information of the serving cell measured by the UE when initiating 4-step random access;

information of the serving cell measured by the UE when backing off from 2-step random access to 4-step random access.

Optionally, the information of the neighbor cells may include at least one of:

IDs of the neighbor cells;

RSRP of the neighbor cells;

RSRQ of the neighbor cells;

a SINR of the neighbor cells;

an ID of a second beam;

the number of beams with quality higher than a preset threshold value;

RSRP of the second beam;

RSRQ of the second beam; or a SINR of the second beam.

Optionally, the second beam may be any one of:

beams of the neighbor cells with quality higher than the preset threshold value, measured by the UE; or beams of all neighbor cells measured by the UE.

Optionally, the ID of the serving cell or IDs of the neighbor cells may include at least one of:

a physical-layer cell ID; or a globally unique cell ID.

An embodiment of the disclosure also provides a method for recording and reporting information, which may be applied to UE and include the following operation.

random access related information is recorded. The random access related information may include at least one type of the following information to be recorded and reported:

an ID of the beam which sent message A of 2-step random access by the UE;

a number of messages A of 2-step random access sent by the UE;

a size of message A sent by the UE, or a size configured by a network-side device to send message A, or a size of another content except a preamble in message A;

a cause for the UE to switch from 2-step random access to 4-step random access;

an actual value corresponding to a threshold configured by the network-side device for initiating 2-step random access;

time elapsed since the UE switching from 2-step random access to 4-step random access;

the number of attempts of the UE on 2-step random access before switching to 4-step random access, or the maximum number of attempts, configured by the network-side device, of the UE on 2-step random access before the UE backs off to 4-step random access;

information of a serving cell and neighbor cells measured by the UE when determining that 2-step random access does not succeed or fails;

information of the serving cell and the neighbor cells measured by the UE when successfully receiving or decoding message B;

information of the serving cell and the neighbor cells measured by the UE when successfully receiving or decoding message 4;

information of the serving cell and the neighbor cells measured by the UE when successfully receiving or decoding an RAR; or information of the serving cell and the neighbor cells measured by the UE when successfully receiving or decoding an RRC message.

Optionally, the random access related information may further include at least one of:

an ID of the serving cell;

information of the serving cell measured by the UE when sending the preamble; or information of the neighbor cells measured by the UE when sending the preamble.

Optionally, after the operation that random access related information is recorded, the method may further include the following operation.

The random access related information is reported to the network-side device.

Optionally, before the operation that random access related information is recorded, the method may further include the following operation.

A random access related information recording instruction of the network-side device is received. The random access related information recording instruction may instruct the UE to record the random access related information.

Optionally, the operation that the random access related information is reported to the network-side device may include any one of the following operations.

The random access related information is reported to the network-side device during a connected state.

The random access related information is reported to the network-side device during switching to the connected state.

The random access related information is reported to the network-side device during an idle state.

The random access related information is reported to the network-side device during an inactive state.

The random access related information is reported to the network-side device in a random access report.

Optionally, the random access related information may further include at least one of geographic position information, time information or speed information corresponding to the information to be recorded and reported.

Optionally, the threshold configured by the network-side device may include at least one of:

RSRP;

RSRQ; or a SINR.

Optionally, the information of the serving cell may include at least one of:

RSRP of the serving cell;

RSRQ of the serving cell;

a SINR of the serving cell;

an ID of a first beam;

the number of beams with quality higher than a preset threshold value;

RSRP of the first beam;

RSRQ of the first beam; or a SINR of the first beam.

Optionally, the first beam may be any one of:

a beam used for message A transmission by the UE or beam corresponding to message A transmission by the UE;

a beam used for the preamble transmission by the UE or beam corresponding to the preamble transmission by the UE;

a beam with quality higher than the preset threshold value, measured by the UE; or all beams measured by the UE.

Optionally, the information of the serving cell measured by the UE may include at least one of:

information of the serving cell measured by the UE when initiating 2-step random access;

information of the serving cell measured by the UE when initiating 4-step random access;

information of the serving cell measured by the UE when backing off from 2-step random access to 4-step random access.

Optionally, the information of the neighbor cells may include at least one of:

IDs of the neighbor cells;

RSRP of the neighbor cells;

RSRQ of the neighbor cells;

SINRs of the neighbor cells;

an ID of a second beam;

the number of beams with quality higher than a preset threshold value;

RSRP of the second beam;

RSRQ of the second beam; or a SINR of the second beam.

Optionally, the second beam may be any one of:

beams of the neighbor cells with quality higher than the preset threshold value, measured by the UE; or beams of all neighbor cells measured by the UE.

Optionally, the ID of the serving cell or IDs of the neighbor cells may include at least one of:

a physical-layer cell ID; or a globally unique cell ID.

An embodiment of the disclosure also provides an apparatus for recording and reporting information, which may be applied to a network-side device and include a sending module.

The sending module may be configured to send a random access related information recording instruction to UE. The random access related information recording instruction may instruct the UE to record random access related information. The random access related information may include at least one type of the following information to be recorded and reported:

an ID of the beam which sent message A of 2-step random access by the UE;

a number of messages A of 2-step random access sent by the UE;

a size of message A sent by the UE, or a size configured by the network-side device to send message A, or a size of another content except a preamble in message A;

a cause for the UE to switch from 2-step random access to 4-step random access;

an actual value corresponding to a threshold configured by the network-side device for initiating 2-step random access;

time elapsed since the UE switching from 2-step random access to 4-step random access;

the number of attempts of the UE on 2-step random access before switching to 4-step random access, or the maximum number of attempts, configured by the network-side device, of the UE on 2-step random access before the UE backs off to 4-step random access;

information of a serving cell and neighbor cells measured by the UE when determining that 2-step random access does not succeed or fails;

information of the serving cell and the neighbor cells measured by the UE when successfully receiving or decoding message B;

information of the serving cell and the neighbor cells measured by the UE when successfully receiving or decoding message 4;

information of the serving cell and the neighbor cells measured by the UE when successfully receiving or decoding an RAR; or information of the serving cell and the neighbor cells measured by the UE when successfully receiving or decoding an RRC message.

Optionally, the random access related information may further include at least one type of the following information to be recorded and reported:

an ID of the serving cell;

information of the serving cell measured by the UE when sending the preamble; or information of the neighbor cells measured by the UE when sending the preamble.

Optionally, the apparatus may further include a receiving module and a processing module.

The receiving module may be configured to receive the random access related information reported by the UE.

The processing module may be configured to configure a random access parameter according to the random access related information.

Optionally, the sending module may further be configured to send a random access related information reporting instruction to the UE. The random access related information reporting instruction may instruct the UE to report the recorded random access related information.

Optionally, the random access related information may further include at least one of geographic position information, time information or speed information corresponding to the information to be recorded and reported.

Optionally, the threshold configured by the network-side device may include at least one of:

RSRP;

RSRQ; or a SINR.

Optionally, the information of the serving cell may include at least one of:

RSRP of the serving cell;

RSRQ of the serving cell;

a SINR of the serving cell;

an ID of a first beam;

the number of beams with quality higher than a preset threshold value;

RSRP of the first beam;

RSRQ of the first beam; or a SINR of the first beam.

Optionally, the first beam may be any one of:

a beam used for message A transmission by the UE or beam corresponding to message A transmission by the UE;

a beam used for the preamble transmission by the UE or beam corresponding to the preamble transmission by the UE;

a beam with quality higher than the preset threshold value, measured by the UE; or all beams measured by the UE.

Optionally, the information of the serving cell measured by the UE may include at least one of:

information of the serving cell measured by the UE when initiating 2-step random access; or information of the serving cell measured by the UE when initiating 4-step random access; or information of the serving cell measured by the UE when backing off from 2-step random access to 4-step random access.

Optionally, the information of the neighbor cells may include at least one of:

IDs of the neighbor cells;
RSRP of the neighbor cells;
RSRQ of the neighbor cells;
SINRs of the neighbor cells;
an ID of a second beam;
the number of beams with quality higher than a preset threshold value;
RSRP of the second beam;
RSRQ of the second beam; or
a SINR of the second beam.

Optionally, the second beam may be any one of:

beams of the neighbor cells with quality higher than the preset threshold value, measured by the UE; or
beams of all neighbor cells measured by the UE.

Optionally, the ID of the serving cell or IDs of the neighbor cells may include at least one of:

a physical-layer cell ID; or
a globally unique cell ID.

An embodiment of the disclosure also provides an apparatus for recording and reporting information, which may be applied to a network-side device and include a processor and a transceiver.

The transceiver may be configured to send a random access related information recording instruction to UE. The random access related information recording instruction may instruct the UE to record random access related information. The random access related information may include at least one type of the following information to be recorded and reported:

an ID of the beam which sent message A of 2-step random access by the UE;
a number of messages A of 2-step random access sent by the UE;
a size of message A sent by the UE, or a size configured by the network-side device to send message A, or a size of another content except a preamble in message A;
a cause for the UE to switch from 2-step random access to 4-step random access;
an actual value corresponding to a threshold configured by the network-side device for initiating 2-step random access;
time elapsed since the UE switching from 2-step random access to 4-step random access;
the number of attempts of the UE on 2-step random access before switching to 4-step random access, or the maximum number of attempts, configured by the network-side device, of the UE on 2-step random access before the UE backs off to 4-step random access;
information of a serving cell and neighbor cells measured by the UE when determining that 2-step random access does not succeed or fails;
information of the serving cell and the neighbor cells measured by the UE when successfully receiving or decoding message B;
information of the serving cell and the neighbor cells measured by the UE when successfully receiving or decoding message 4;
information of the serving cell and the neighbor cells measured by the UE when successfully receiving or decoding an RAR; or
information of the serving cell and the neighbor cells measured by the UE when successfully receiving or decoding an RRC message.

Optionally, the random access related information may further include at least one type of the following information to be recorded and reported:

an ID of the serving cell;
information of the serving cell measured by the UE when sending the preamble; or
information of the neighbor cells measured by the UE when sending the preamble.

Optionally, the transceiver may further be configured to receive the random access related information reported by the UE.

The processor may be configured to configure a random access parameter according to the random access related information.

Optionally, the transceiver may further be configured to send a random access related information reporting instruction to the UE. The random access related information reporting instruction may instruct the UE to report the recorded random access related information.

Optionally, the random access related information may further include at least one of geographic position information, time information or speed information corresponding to the information to be recorded and reported.

Optionally, the threshold configured by the network-side device may include at least one of:

RSRP;
RSRQ; or
a SINR.

Optionally, the information of the serving cell may include at least one of:

RSRP of the serving cell;
RSRQ of the serving cell;
a SINR of the serving cell;
an ID of a first beam;
the number of beams with quality higher than a preset threshold value;
RSRP of the first beam;
RSRQ of the first beam; or
a SINR of the first beam.

Optionally, the first beam may be any one of:

a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

Optionally, the information of the serving cell measured by the UE may include at least one of:

information of the serving cell measured by the UE when initiating 2-step random access; or
information of the serving cell measured by the UE when initiating 4-step random access; or
information of the serving cell measured by the UE when backing off from 2-step random access to 4-step random access.

Optionally, the information of the neighbor cells may include at least one of:
  IDs of the neighbor cells;
  RSRP of the neighbor cells;
  RSRQ of the neighbor cells;
  SINRs of the neighbor cells;
  an ID of a second beam;
  the number of beams with quality higher than a preset threshold value;
  RSRP of the second beam;
  RSRQ of the second beam; or
  a SINR of the second beam.

Optionally, the second beam may be any one of:
  beams of the neighbor cells with quality higher than the preset threshold value, measured by the UE; or
  beams of all neighbor cells measured by the UE.

Optionally, the ID of the serving cell or IDs of the neighbor cells may include at least one of:
  a physical-layer cell ID; or
  a globally unique cell ID.

An embodiment of the disclosure also provides an apparatus for recording and reporting information, which may be applied to UE and include a recording module.

The recording module may be configured to record random access related information. The random access related information may include at least one of:
  an ID of the beam which sent message A of 2-step random access by the UE;
  a number of messages A of 2-step random access sent by the UE;
  a size of message A sent by the UE, or a size configured by a network-side device to send message A, or a size of another content except a preamble in message A;
  a cause for the UE to switch from 2-step random access to 4-step random access;
  an actual value corresponding to a threshold configured by the network-side device for initiating 2-step random access;
  time elapsed since the UE switching from 2-step random access to 4-step random access;
  the number of attempts of the UE on 2-step random access before switching to 4-step random access, or the maximum number of attempts, configured by the network-side device, of the UE on 2-step random access before the UE backs off to 4-step random access;
  information of a serving cell and neighbor cells measured by the UE when determining that 2-step random access does not succeed or fails;
  information of the serving cell and the neighbor cells measured by the UE when successfully receiving or decoding message B;
  information of the serving cell and the neighbor cells measured by the UE when successfully receiving or decoding message 4;
  information of the serving cell and the neighbor cells measured by the UE when successfully receiving or decoding an RAR; or
  information of the serving cell and the neighbor cells measured by the UE when successfully receiving or decoding an RRC message.

Optionally, the random access related information may further include at least one type of the following information to be recorded and reported:
  an ID of the serving cell;
  information of the serving cell measured by the UE when sending the preamble; or
  information of the neighbor cells measured by the UE when sending the preamble.

Optionally, the apparatus may further include a sending module.

The sending module may be configured to report the random access related information to the network-side device.

Optionally, the apparatus may further include a receiving module.

The receiving module may be configured to receive a random access related information reporting instruction of the network-side device. The random access related information reporting instruction may instruct the UE to report the recorded random access related information.

Optionally, the sending module may further be configured to execute of any one of:
  reporting the random access related information to the network-side device during a connected state;
  reporting the random access related information to the network-side device during switching to the connected state;
  reporting the random access related information to the network-side device during an idle state;
  reporting the random access related information to the network-side device during an inactive state; or
  reporting the random access related information to the network-side device in a random access report.

Optionally, the random access related information may further include at least one of geographic position information, time information or speed information corresponding to information to be recorded and reported.

Optionally, the threshold configured by the network-side device may include at least one of:
  RSRP;
  RSRQ; or
  a SINR.

Optionally, the information of the serving cell may include at least one of:
  RSRP of the serving cell;
  RSRQ of the serving cell;
  a SINR of the serving cell;
  an ID of a first beam;
  the number of beams with quality higher than a preset threshold value;
  RSRP of the first beam;
  RSRQ of the first beam; or
  a SINR of the first beam.

Optionally, the first beam may be any one of:
  a beam used for message A transmission by the UE or beam corresponding to message A transmission by the UE;
  a beam used for the preamble transmission by the UE or beam corresponding to the preamble transmission by the UE;
  a beam with quality higher than the preset threshold value, measured by the UE; or
  all beams measured by the UE.

Optionally, the information of the serving cell measured by the UE may include at least one of:
  information of the serving cell measured by the UE when initiating 2-step random access; or
  information of the serving cell measured by the UE when initiating 4-step random access; or
  information of the serving cell measured by the UE when backing off from 2-step random access to 4-step random access.

Optionally, the information of the neighbor cells may include at least one of:
  IDs of the neighbor cells;
  RSRP of the neighbor cells;
  RSRQ of the neighbor cells;
  SINRs of the neighbor cells;
  an ID of a second beam;
  the number of beams with quality higher than a preset threshold value;
  RSRP of the second beam;
  RSRQ of the second beam; or
  a SINR of the second beam.

Optionally, the second beam may be any one of:
  beams of the neighbor cells with quality higher than the preset threshold value, measured by the UE; or
  beams of all neighbor cells measured by the UE.

Optionally, the ID of the serving cell or IDs of the neighbor cells may include at least one of:
  a physical-layer cell ID; or
  a globally unique cell ID.

An embodiment of the disclosure also provides an apparatus for recording and reporting information, which may be applied to UE and include a processor and a transceiver.

The processor may be configured to record random access related information.

The random access related information may include at least one of:
  an ID of the beam which sent message A of 2-step random access by the UE;
  a number of messages A of 2-step random access sent by the UE;
  a size of message A sent by the UE, or a size configured by a network-side device to send message A, or a size of another content except a preamble in message A;
  a cause for the UE to switch from 2-step random access to 4-step random access;
  an actual value corresponding to a threshold configured by the network-side device for initiating 2-step random access;
  time elapsed since the UE switching from 2-step random access to 4-step random access;
  the number of attempts of the UE on 2-step random access before switching to 4-step random access, or the maximum number of attempts, configured by the network-side device, of the UE on 2-step random access before the UE backs off to 4-step random access;
  information of a serving cell and neighbor cells measured by the UE when determining that 2-step random access does not succeed or fails;
  information of the serving cell and the neighbor cells measured by the UE when successfully receiving or decoding message B;
  information of the serving cell and the neighbor cells measured by the UE when successfully receiving or decoding message 4;
  information of the serving cell and the neighbor cells measured by the UE when successfully receiving or decoding an RAR; or
  information of the serving cell and the neighbor cells measured by the UE when successfully receiving or decoding an RRC message.

Optionally, the random access related information may further include at least one type of the following information to be recorded and reported:
  an ID of the serving cell;
  information of the serving cell measured by the UE when sending the preamble; or
  information of the neighbor cells measured by the UE when sending the preamble.

Optionally, the transceiver may be configured to report the random access related information to the network-side device.

Optionally, the transceiver may further be configured to receive a random access related information reporting instruction of the network-side device. The random access related information reporting instruction may instruct the UE to report the recorded random access related information.

Optionally, the transceiver may be configured to execute of any one of:
  reporting the random access related information to the network-side device during a connected state;
  reporting the random access related information to the network-side device during switching to the connected state;
  reporting the random access related information to the network-side device during an idle state;
  reporting the random access related information to the network-side device during an inactive state; or
  reporting the random access related information to the network-side device in a random access report.

Optionally, the random access related information may further include at least one of geographic position information, time information or speed information corresponding to information to be recorded and reported.

Optionally, the threshold configured by the network-side device may include at least one of:
  RSRP;
  RSRQ; or
  a SINR.

Optionally, the information of the serving cell may include at least one of:
  RSRP of the serving cell;
  RSRQ of the serving cell;
  a SINR of the serving cell;
  an ID of a first beam;
  the number of beams with quality higher than a preset threshold value;
  RSRP of the first beam;
  RSRQ of the first beam; or
  a SINR of the first beam.

Optionally, the first beam may be any one of:
  a beam used for message A transmission by the UE or beam corresponding to message A transmission by the UE;
  a beam used for the preamble transmission by the UE or beam corresponding to the preamble transmission by the UE;
  a beam with quality higher than the preset threshold value, measured by the UE; or
  all beams measured by the UE.

Optionally, the information of the serving cell measured by the UE may include at least one of:
  information of the serving cell measured by the UE when initiating 2-step random access; or
  information of the serving cell measured by the UE when initiating 4-step random access; or
  information of the serving cell measured by the UE when backing off from 2-step random access to 4-step random access.

Optionally, the information of the neighbor cells may include at least one of:
  IDs of the neighbor cells;
  RSRP of the neighbor cells;

RSRQ of the neighbor cells;
SINRs of the neighbor cells;
an ID of a second beam;
the number of beams with quality higher than a preset threshold value;
RSRP of the second beam;
RSRQ of the second beam; or
a SINR of the second beam.

Optionally, the second beam may be any one of:
beams of the neighbor cells with quality higher than the preset threshold value, measured by the UE; or
beams of all neighbor cells measured by the UE.

Optionally, the ID of the serving cell or IDs of the neighbor cells may include at least one of:
a physical-layer cell ID; or
a globally unique cell ID.

An embodiment of the disclosure also provides a communication device, which may include a memory, a processor and a computer program stored in the memory and capable of running in the processor. The computer program may be executed by the processor to implement the steps of the method for recording and reporting informations as described above.

An embodiment of the disclosure also provides a computer-readable storage medium having stored therein a computer program which may be executed by a processor to implement the steps of the method for recording and reporting informations as described above.

The embodiments of the disclosure have the following beneficial effects.

In the solutions, the UE may be instructed by the network-side device to record and report related information of 2-step random access or 4-step random access to the network-side device. The network-side device may be helped to configure a reasonable random access related parameter to improve the success rate of random access.

BRIEF DESCRIPTION OF THE DRAWINGS

In order to describe the technical solutions of the embodiments of the disclosure more clearly, the drawings needed in the descriptions about the embodiments of the disclosure will be introduced simply below. It is apparent that the drawings described below are merely some embodiments of the disclosure. Those ordinary skilled in the art may further obtain other drawings according to these drawings without creative work.

FIG. 3 is a flowchart of a method for recording and reporting information applied to a network-side device according to an embodiment of the disclosure.

DETAILED DESCRIPTION

Figure 1:
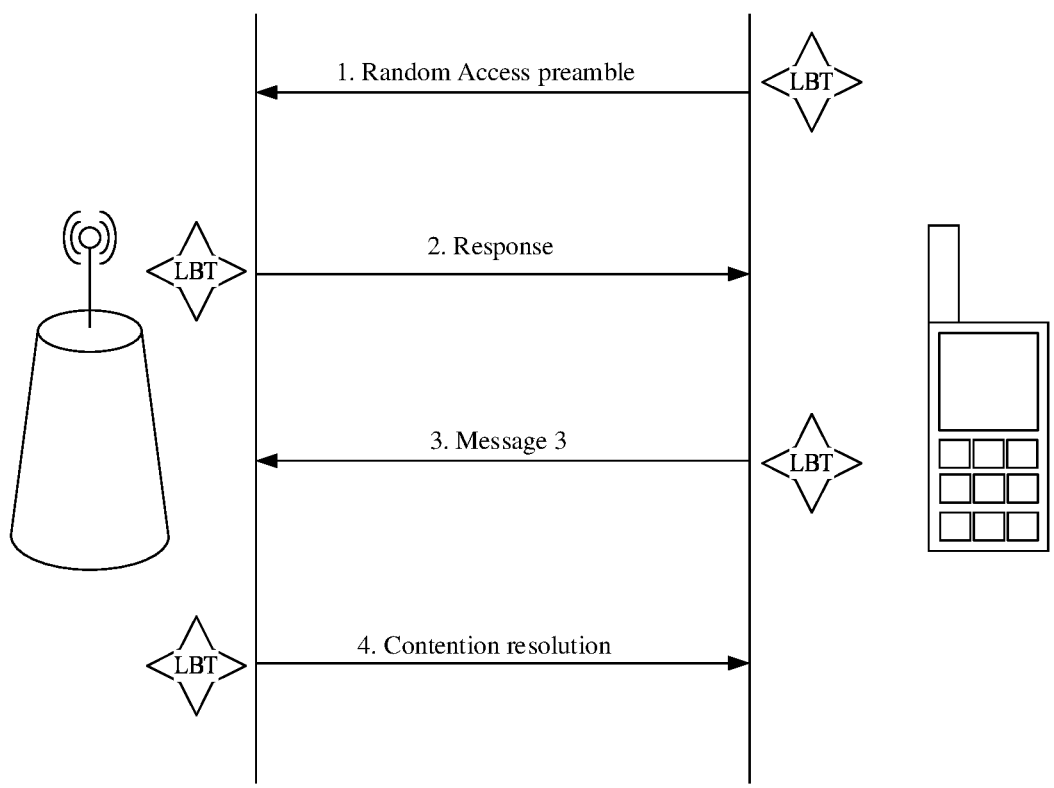
FIG. 1 is a schematic diagram of a 4-step random access mechanism.
Figure 2:
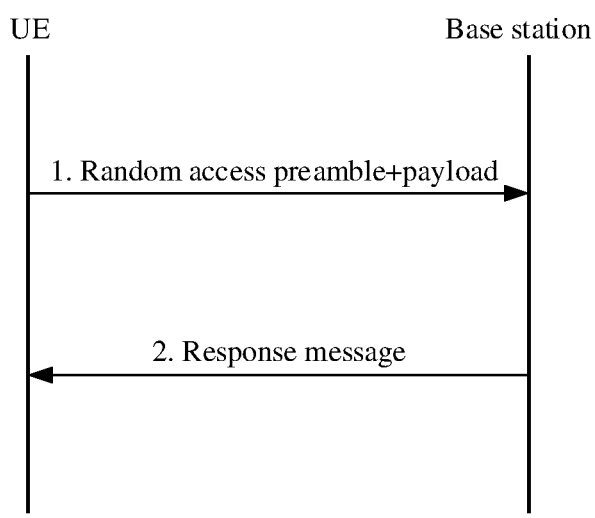
FIG. 2 is a schematic diagram of a 2-step random access mechanism.

In order to make the technical problem to be solved, technical solutions and advantages of the embodiments of the disclosure clearer, detailed descriptions will be made below in combination with the drawings and specific embodiments.

Exemplary embodiments of the disclosure will now be described with reference to the drawings in more detail. Although the exemplary embodiments of the disclosure are shown in the drawings, it is to be understood that the disclosure may be implemented in various forms and should not be limited to the embodiments described here. Instead, these embodiments are provided to make the disclosure understood more thoroughly and deliver the scope of the disclosure to those skilled in the art completely.

Terms "first", "second" and the like in the specification and claims of the present disclosure are used to distinguish similar objects and do not necessarily describe a specific sequence or order. It is to be understood that data used like this may be interchanged as appropriate such that the embodiments of the present disclosure described here may be implemented, for example, according to sequences in addition to those illustrated or described here. In addition, terms "include" and "have" and any transformations thereof are intended to cover nonexclusive inclusions. For example, a process, method, system, product, or device including a series of steps or units is not limited to the steps or units that are clearly listed but may include other steps or units that are not clearly listed or intrinsic to the process, the method, the product, or the device. "And/or" in the specification and the claims represents at least one of connected objects.

The technologies described herein are not limited to a Long Term Evolution (LTE)/LTE-Advanced (LTE-A) system, and may also be applied to various wireless communication systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. Terms "system" and "network" are usually used interchangeably. The CDMA system may implement radio technologies such as CDMA2000 and Universal Terrestrial Radio Access (UTRA). UTRA includes Wideband CDMA (WCDMA) and other CDMA variations. The TDMA system may implement radio technologies such as Global System for Mobile Communication (GSM). The OFDMA system may implement radio technologies such as Ultra Mobile Broadband (UMB), Evolution-UTRA (E-UTRA), Institute of Electrical and Electronics Engineers (IEEE) 802.11 (Wireless Fidelity (Wi-Fi), IEEE 802.16 (World Interoperability for Microwave Access (WiMAX), IEEE 802.20, and Flash-OFDM. UTRA and E-UTRA are part of Universal Mobile Telecommunications System (UMTS). LTE and more advanced LTE (such as LTE-A) are new UMTS releases using E-UTRA. UTRA, E-UTRA, UMTS, LTE, LTE-A and GSM are described in the documents from the organization named after "3rd Generation Partnership Project (3GPP)". CDMA2000 and UMB are described in the documents from the organization named after "3GPP2". The technologies described herein may be applied not only to the above-mentioned systems and radio technologies but also to other systems and radio technologies. However, a New Radio (NR) system is described below as an example, and NR terms are used in most of the following descriptions although these technologies may also be applied to systems except the NR system.

The following descriptions are exemplary and not intended to limit the scope, applicability or configuration described in the claims. Functions and arrangements of discussed elements may be changed without departing from the spirit and scope of the disclosure. Various procedures or components may be omitted, replaced or added appropriately in each example. For example, the described method may be executed in sequences different from that described here, and various steps may be added, omitted or combined. In addition, features described with reference to some examples may be combined in other examples.

In the related art, UE does not establish a connection with a network-side device when initiating 2-step or 4-step random access, so the network-side device may not know about a performance condition of random access of the UE. As a result, the network-side device may not configure a random access parameter reasonably, and random access may fail.

In order to solve the foregoing problem, the embodiments of the disclosure provide a method for recording and reporting information and apparatus, which may help a network-side device to configure a random access parameter reasonably.

An embodiment of the disclosure provides a method for recording and reporting information, which is applied to a network-side device and, as shown in FIG. 3, includes the following operation.

In 101, a random access related information recording instruction is sent to UE. The random access related information recording instruction instructs the UE to record random access related information. The random access related information includes at least one type of the following information to be recorded and reported:

an ID of the beam which sent message A of 2-step random access by the UE;

a number of messages A of 2-step random access sent by the UE, which may be the total number of messages A or the number of messages A on each beam;

a size of message A sent by the UE, or a size configured by a network-side device to send message A, or a size of another content except a preamble in message A the size of another content except a preamble in message A might not include the size of the padding;

a cause for the UE to switch from 2-step random access to 4-step random access, e.g., cell quality of a serving cell is too low, message B is not correctly received or decoded or a fallback RAR is received, or the UE does not receive any feedback or message of the network-side device some time later after sending message A;

an actual value corresponding to a threshold configured by the network-side device for initiating 2-step random access, which may be measured before each attempt of the UE on 2-step random access, where a threshold of cell or beam quality measured by the UE is, for example, RSRP, or RSRQ, or a SINR, or a combination of any two or three therein; for example, the network-side device configures a cell-level RSRP threshold T1 and RSRQ threshold T2, when RSRP measured by the UE is higher than T1 and RSRQ is higher than T2, it indicates that the UE may initiate 2-step random access, and in such case, the UE records practically measured RSRP and RSRQ values; for another example, the network-side device configures a cell-level RSRP threshold T1 and a beam-level RSRP threshold T3, when cell-level RSRP measured by the UE is higher than T1 and beam-level RSRP is higher than T3, it indicates that the UE may initiate 2-step random access, and in such case, the UE records practically measured cell-level RSRP and beam-level RSRP values;

time elapsed since the UE switching from 2-step random access to 4-step random access, e.g., a time difference from sending message A to sending preamble (message 1, or a time difference from sending message A to message 3, or a time difference from sending message A to receiving an RAR (message 2) by the UE;

the number of attempts of the UE on 2-step random access before switching to 4-step random access, or the maximum number of attempts, configured by the network-side device, of the UE on 2-step random access before the UE backs off to 4-step random access;

information of a serving cell and neighbor cells measured by the UE when determining that 2-step random access does not succeed or fails;

information of the serving cell and the neighbor cells measured by the UE when successfully receiving or decoding message B;

information of the serving cell and the neighbor cells measured by the UE when successfully receiving or decoding message 4;

information of the serving cell and the neighbor cells measured by the UE when successfully receiving or decoding an RAR; or information of the serving cell and the neighbor cells measured by the UE when successfully receiving or decoding an RRC message.

According to the ID of the beam which sent message A of 2-step random access sent by the UE and the number of message A of 2-step random access, the network-side device may know about a distribution situation of UE, e.g., a specific beam covering a region where more UEs are distributed. If the random access initiated by the beam always collides or fails or corresponds to more failures or attempts, the network-side device needs to configure more random access resources to the beam so as to reduce the collision probability of random access of the UE. Otherwise, random access resources corresponding to the beam may be reduced.

According to the size of message A sent by the UE, or the size configured by the network-side device to send message A or the size of the other content except the preamble in message A and in combination with the number of attempts of the UE on random access or the number of failures, the network-side device may judge whether a size configured for the UE to send message A or a size allowed for the UE to send message A is appropriate. For example, if message A always fails to be sent, the size configured for the UE to send message A or the size allowed for the UE to send message A may be too large and needs to be reduced. If message A is always sent successfully quickly, the network-side device may consider to increase the size configured for the UE to send message A or the size allowed for the UE to send message A.

According to the cause for the UE to switch from 2-step random access to 4-step random access, and/or the practical value corresponding to the threshold configured by the network-side device for initiating 2-step random access, and/or the time elapsed since the UE switching from 2-step random access to 4-step random access, and/or the number of attempts of the UE on 2-step random access before switching to 4-step random access or the maximum number of attempts, configured by the network-side device, of the UE on 2-step random access before the UE backs off to 4-step random access, the network-side device may judge whether an RSRP or RSRQ or SINR threshold configured for the UE to attempt 2-step random access and the maximum number of attempts on 2-step random access are appropriate. If cell quality measured by the UE is higher than the RSRP or RSRQ or SINR threshold but attempted 2-step random access always fails, it indicates that the threshold is configured relatively low and needs to be increased. In such case, the maximum number of attempts on 2-step random access may also be set lower. This is because, if the RSRP or RSRQ or SINR threshold is set too low and the quality measured by the UE is just a little higher than the threshold, it is hard to succeed no matter how many attempts are made, and more attempts may rather prolong a random access delay of the UE. If the time elapsed since the UE switching from 2-step random access to 4-step random access is relatively long, it indicates that the number of attempts of the UE on 2-step random access is too large and needs to be reduced.

According to the information of the serving cell and the neighbor cells measured by the UE when determining that 2-step random access does not succeed or fails, and/or the information of the serving cell and the neighbor cells measured by the UE when successfully receiving or decoding message B, and/or, the information of the serving cell and the neighbor cells measured by the UE when successfully receiving or decoding message 4, and/or the information of the serving cell and the neighbor cells measured by the UE when successfully receiving or decoding the RAR, and/or the information of the serving cell and the neighbor cells measured by the UE when successfully receiving or decoding the RRC message, the network-side device may determine present position information of the UE, e.g., in a center or edge of the serving cell or close to the neighbor cells. Then, whether a 2-step random access resource configured by the network side is reasonable may be judged in combination with information such as the number of attempts on 2-step random access and the consumed time. If UE in the center of the serving cell always fails in 2-step random access, the network-side device needs to configure more 2-step random access resources or increase the RSRP or RSRQ or SINR threshold configured for the UE to attempt 2-step random access so as to reduce the probability that the UE attempts 2-step random access.

In the embodiment, the UE may be instructed by the network-side device to record and report related information of 2-step random access or 4-step random access to the network-side device. The network-side device may be helped to configure a reasonable random access related parameter to improve the success rate of random access.

The network-side device may be a network manager, a Trace Collection Entity (TCE), or a base station. The network-side device sends the random access related information recording instruction to the UE after configuring the UE to record the random access related information.

Optionally, the random access related information further includes at least one type of the following information to be recorded and reported:
  an ID of the serving cell;
  information of the serving cell measured by the UE when sending the preamble; or
  information of the neighbor cells measured by the UE when sending the preamble.

Optionally, after the operation that a random access related information recording instruction is sent to UE, the method further includes the following operations.

The random access related information reported by the UE is received.
  configuring a random access parameter according to the random access related information.

After the network-side device receives the random access related information reported by the UE, corresponding network coverage and parameter optimization may be performed. For example, a quality threshold value for 2-step random access of the UE is optimized. A coverage corresponding to message A is optimized, including beam-level and cell-level coverage optimization.

Optionally, before the operation that the random access related information reported by the UE is received, the method further includes the following operation.

A random access related information reporting instruction is sent to the UE. The random access related information reporting instruction instructs the UE to report the recorded random access related information.

Optionally, the random access related information further includes at least one of geographic position information, time information or speed information corresponding to the information to be recorded and reported.

Optionally, the threshold configured by the network-side device includes at least one of:
  RSRP;
  RSRQ; or
  a SINR.

Optionally, the information of the serving cell includes at least one of:
  RSRP of the serving cell;
  RSRQ of the serving cell;
  a SINR of the serving cell;
  an ID of a first beam;
  the number of beams with quality higher than a preset threshold value;
  RSRP of the first beam;
  RSRQ of the first beam; or
  a SINR of the first beam.

Optionally, the first beam is any one of:
  a beam used for message A transmission by the UE or beam corresponding to message A transmission by the UE;
  a beam used for the preamble transmission by the UE or beam corresponding to the preamble transmission by the UE;
  a beam with quality higher than the preset threshold value, measured by the UE; or
  all beams measured by the UE.

Optionally, the information of the serving cell measured by the UE includes at least one of:
  information of the serving cell measured by the UE when initiating 2-step random access; or
  information of the serving cell measured by the UE when initiating 4-step random access; or
  information of the serving cell measured by the UE when backing off from 2-step random access to 4-step random access.

Optionally, the information of the neighbor cells includes at least one of:
  IDs of the neighbor cells;
  RSRP of the neighbor cells;
  RSRQ of the neighbor cells;
  SINRs of the neighbor cells;
  an ID of a second beam;
  the number of beams with quality higher than a preset threshold value;
  RSRP of the second beam;

RSRQ of the second beam; or
a SINR of the second beam.
Optionally, the second beam is any one of:
beams of the neighbor cells with quality higher than the preset threshold value, measured by the UE; or
beams of all neighbor cells measured by the UE.
Optionally, the ID of the serving cell or IDs of the neighbor cells may include at least one of:
a physical-layer cell ID; or
a globally unique cell ID, e.g., an Evolved UMTS Terrestrial Radio Access Network (E-UTRAN) Cell Global Identifier (ECGI) and an NR Cell Global Identifier (NCGI).

Figure 4:
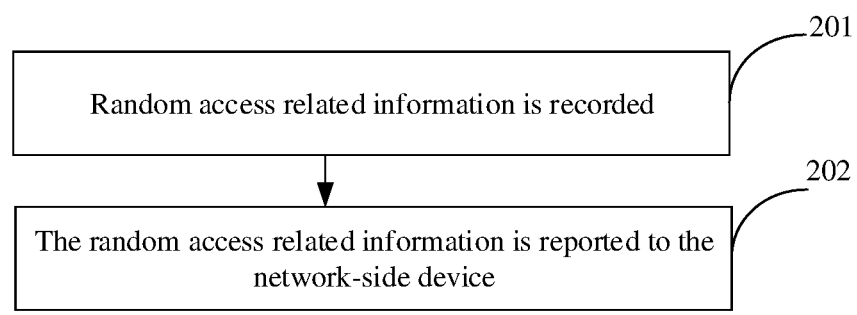
FIG. 4 is a flowchart of a method for recording and reporting information applied to UE according to an embodiment of the disclosure.

An embodiment of the disclosure also provides a method for recording and reporting information, which is applied to UE and, as shown in FIG. 4, includes the following operation.

In 201, random access related information is recorded. The random access related information includes at least one type of the following information to be recorded and reported:
an ID of the beam which sent message A of 2-step random access by the UE;
a number of messages A of 2-step random access sent by the UE;
a size of message A sent by the UE, or a size configured by a network-side device to send message A, or a size of another content except a preamble in message A;
a cause for the UE to switch from 2-step random access to 4-step random access;
an actual value corresponding to a threshold configured by the network-side device for initiating 2-step random access;
time elapsed since the UE switching from 2-step random access to 4-step random access;
the number of attempts of the UE on 2-step random access before switching to 4-step random access, or the maximum number of attempts, configured by the network-side device, of the UE on 2-step random access before the UE backs off to 4-step random access;
information of a serving cell and neighbor cells measured by the UE when determining that 2-step random access does not succeed or fails;
information of the serving cell and the neighbor cells measured by the UE when successfully receiving or decoding message B;
information of the serving cell and the neighbor cells measured by the UE when successfully receiving or decoding message 4;
information of the serving cell and the neighbor cells measured by the UE when successfully receiving or decoding an RAR; or
information of the serving cell and the neighbor cells measured by the UE when successfully receiving or decoding an RRC message.

In the embodiment, the UE may be instructed by the network-side device to record and report related information of 2-step random access or 4-step random access to the network-side device. The network-side device may be helped to configure a reasonable random access related parameter to improve the success rate of random access.

Optionally, the random access related information further includes at least one type of the following information to be recorded and reported:
an ID of the serving cell;
information of the serving cell measured by the UE when sending the preamble; or
information of the neighbor cells measured by the UE when sending the preamble.

Optionally, after the operation that random access related information is recorded, the method further includes the following operation.

In 202, the random access related information is reported to the network-side device.

Optionally, before the operation that random access related information is recorded, the method further includes the following operation.

A random access related information recording instruction of the network-side device is received. The random access related information recording instruction instructs the UE to record the random access related information.

The UE may report the random access related information to the network-side device responsive to a request of the network-side device, or actively, or responsive to a requirement of the network-side device after notifying the network-side device that there is related information.

Optionally, the operation that the random access related information is reported to the network-side device includes any one of the following operations.

The random access related information is reported to the network-side device during a connected state.
The random access related information is reported to the network-side device during switching to the connected state.
The random access related information is reported to the network-side device during an idle state.
The random access related information is reported to the network-side device during an inactive state.
The random access related information is reported to the network-side device in a random access report.

Optionally, the random access related information further includes at least one of geographic position information, time information or speed information corresponding to the information to be recorded and reported.

Optionally, the threshold configured by the network-side device includes at least one of:
RSRP;
RSRQ; or
a SINR.

Optionally, the information of the serving cell includes at least one of:
RSRP of the serving cell;
RSRQ of the serving cell;
a SINR of the serving cell;
an ID of a first beam;
the number of beams with quality higher than a preset threshold value;
RSRP of the first beam;
RSRQ of the first beam; or
a SINR of the first beam.

Optionally, the first beam is any one of:
a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

Optionally, the information of the serving cell measured by the UE includes at least one of:
information of the serving cell measured by the UE when initiating 2-step random access; or information of the serving cell measured by the UE when initiating 4-step random access; or information of the serving cell measured by the UE when backing off from 2-step random access to 4-step random access.

Optionally, the information of the neighbor cells includes at least one of:

IDs of the neighbor cells;

RSRP of the neighbor cells;

RSRQ of the neighbor cells;

SINRs of the neighbor cells;

an ID of a second beam;

the number of beams with quality higher than a preset threshold value;

RSRP of the second beam;

RSRQ of the second beam; or a SINR of the second beam.

Optionally, the second beam is any one of:

beams of the neighbor cells with quality higher than the preset threshold value, measured by the UE; or beams of all neighbor cells measured by the UE.

Optionally, the ID of the serving cell or IDs of the neighbor cells includes at least one of:

a physical-layer cell ID; or a globally unique cell ID.

Figure 5:
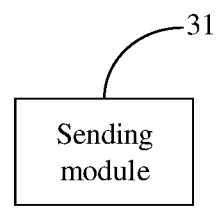
FIG. 5 is a structure block diagram of an apparatus for recording and reporting information applied to a network-side device according to an embodiment of the disclosure.

An embodiment of the disclosure also provides an apparatus for recording and reporting information, which is applied to a network-side device and, as shown in FIG. 5, includes a sending module 31.

The sending module 31 is configured to send a random access related information recording instruction to UE. The random access related information recording instruction instructs the UE to record random access related information. The random access related information includes at least one type of the following information to be recorded and reported:

an ID of the beam which sent message A of 2-step random access by the UE;

a number of messages A of 2-step random access sent by the UE;

a size of message A sent by the UE, or a size configured by the network-side device to send message A, or a size of another content except a preamble in message A;

a cause for the UE to switch from 2-step random access to 4-step random access;

an actual value corresponding to a threshold configured by the network-side device for initiating 2-step random access;

time elapsed since the UE switching from 2-step random access to 4-step random access;

the number of attempts of the UE on 2-step random access before switching to 4-step random access, or the maximum number of attempts, configured by the network-side device, of the UE on 2-step random access before the UE backs off to 4-step random access;

information of a serving cell and neighbor cells measured by the UE when determining that 2-step random access does not succeed or fails;

information of the serving cell and the neighbor cells measured by the UE when successfully receiving or decoding message B;

information of the serving cell and the neighbor cells measured by the UE when successfully receiving or decoding message 4;

information of the serving cell and the neighbor cells measured by the UE when successfully receiving or decoding an RAR; or information of the serving cell and the neighbor cells measured by the UE when successfully receiving or decoding an RRC message.

In the embodiment, the UE may be instructed by the network-side device to record and report related information of 2-step random access or 4-step random access to the network-side device. The network-side device may be helped to configure a reasonable random access related parameter to improve the success rate of random access.

Optionally, the random access related information further includes at least one type of the following information to be recorded and reported:

an ID of the serving cell;

information of the serving cell measured by the UE when sending the preamble; or information of the neighbor cells measured by the UE when sending the preamble.

Optionally, the apparatus further includes a receiving module and a processing module.

The receiving module is configured to receive the random access related information reported by the UE.

The processing module is configured to configure a random access parameter according to the random access related information.

Optionally, the sending module is further configured to send a random access related information reporting instruction to the UE. The random access related information reporting instruction instructs the UE to report the recorded random access related information.

Optionally, the random access related information further includes at least one of geographic position information, time information or speed information corresponding to the information to be recorded and reported.

Optionally, the threshold configured by the network-side device includes at least one of:

RSRP;

RSRQ; or a SINR.

Optionally, the information of the serving cell includes at least one of:

RSRP of the serving cell;

RSRQ of the serving cell;

a SINR of the serving cell;

an ID of a first beam;

the number of beams with quality higher than a preset threshold value;

RSRP of the first beam;

RSRQ of the first beam; or a SINR of the first beam.

Optionally, the first beam is any one of:

a beam used for message A transmission by the UE or beam corresponding to message A transmission by the UE;

a beam used for the preamble transmission by the UE or beam corresponding to the preamble transmission by the UE;

a beam with quality higher than the preset threshold value, measured by the UE; or all beams measured by the UE.

Optionally, the information of the serving cell measured by the UE includes at least one of:

information of the serving cell measured by the UE when initiating 2-step random access; or information of the serving cell measured by the UE when initiating 4-step random access; or information of the serving cell measured by the UE when backing off from 2-step random access to 4-step random access.

Optionally, the information of the neighbor cells includes at least one of:
IDs of the neighbor cells;
RSRP of the neighbor cells;
RSRQ of the neighbor cells;
SINRs of the neighbor cells;
an ID of a second beam;
the number of beams with quality higher than a preset threshold value;
RSRP of the second beam;
RSRQ of the second beam; or
a SINR of the second beam.

Optionally, the second beam is any one of:
beams of the neighbor cells with quality higher than the preset threshold value, measured by the UE; or
beams of all neighbor cells measured by the UE.

Optionally, the ID of the serving cell or IDs of the neighbor cells includes at least one of:
a physical-layer cell ID; or
a globally unique cell ID.

Figure 6:
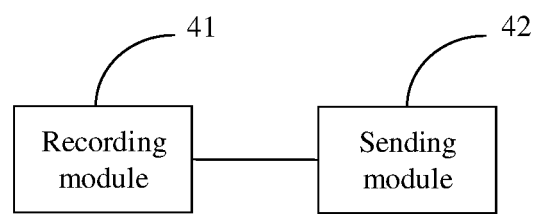
FIG. 6 is a structure block diagram of an apparatus for recording and reporting information applied to UE according to an embodiment of the disclosure.

An embodiment of the disclosure also provides an apparatus for recording and reporting information, which is applied to UE and, as shown in FIG. 6, includes a recording module 41.

The recording module 41 is configured to record random access related information. The random access related information includes at least one type of the following information to be recorded and reported:
an ID of the beam which sent message A of 2-step random access by the UE;
a number of messages A of 2-step random access sent by the UE;
a size of message A sent by the UE, or a size configured by a network-side device to send message A, or a size of another content except a preamble in message A;
a cause for the UE to switch from 2-step random access to 4-step random access;
an actual value corresponding to a threshold configured by the network-side device for initiating 2-step random access;
time elapsed since the UE switching from 2-step random access to 4-step random access;
the number of attempts of the UE on 2-step random access before switching to 4-step random access, or the maximum number of attempts, configured by the network-side device, of the UE on 2-step random access before the UE backs off to 4-step random access;
information of a serving cell and neighbor cells measured by the UE when determining that 2-step random access does not succeed or fails;
information of the serving cell and the neighbor cells measured by the UE when successfully receiving or decoding message B;
information of the serving cell and the neighbor cells measured by the UE when successfully receiving or decoding message 4;
information of the serving cell and the neighbor cells measured by the UE when successfully receiving or decoding an RAR; or
information of the serving cell and the neighbor cells measured by the UE when successfully receiving or decoding an RRC message.

In the embodiment, the UE may be instructed by the network-side device to record and report related information of 2-step random access or 4-step random access to the network-side device. The network-side device may be helped to configure a reasonable random access related parameter to improve the success rate of random access.

Optionally, the random access related information further includes at least one type of the following information to be recorded and reported:
an ID of the serving cell;
information of the serving cell measured by the UE when sending the preamble; or
information of the neighbor cells measured by the UE when sending the preamble.

Optionally, the apparatus further includes a sending module 42.

The sending module 42 is configured to report the random access related information to the network-side device.

Optionally, the apparatus further includes a receiving module.

The receiving module is configured to receive a random access related information reporting instruction of the network-side device. The random access related information reporting instruction instructs the UE to report the recorded random access related information.

Optionally, the sending module is further configured to execute of any one of:
reporting the random access related information to the network-side device during a connected state;
reporting the random access related information to the network-side device during switching to the connected state;
reporting the random access related information to the network-side device during an idle state;
reporting the random access related information to the network-side device during an inactive state; or
reporting the random access related information to the network-side device in a random access report.

Optionally, the random access related information further includes at least one of geographic position information, time information or speed information corresponding to the information to be recorded and reported.

Optionally, the threshold configured by the network-side device includes at least one of:
RSRP;
RSRQ; or
a SINR.

Optionally, the information of the serving cell includes at least one of:
RSRP of the serving cell;
RSRQ of the serving cell;
a SINR of the serving cell;
an ID of a first beam;
the number of beams with quality higher than a preset threshold value;
RSRP of the first beam;
RSRQ of the first beam; or
a SINR of the first beam.

Optionally, the first beam is any one of:
a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

Optionally, the information of the serving cell measured by the UE includes at least one of:
information of the serving cell measured by the UE when initiating 2-step random access; or
information of the serving cell measured by the UE when initiating 4-step random access; or
information of the serving cell measured by the UE when backing off from 2-step random access to 4-step random access.

Optionally, the information of the neighbor cells includes at least one of:
IDs of the neighbor cells;
RSRP of the neighbor cells;
RSRQ of the neighbor cells;
SINRs of the neighbor cells;
an ID of a second beam;
the number of beams with quality higher than a preset threshold value;
RSRP of the second beam;
RSRQ of the second beam; or
a SINR of the second beam.

Optionally, the second beam is any one of:
beams of the neighbor cells with quality higher than the preset threshold value, measured by the UE; or
beams of all neighbor cells measured by the UE.

Optionally, the ID of the serving cell or IDs of the neighbor cells includes at least one of:
a physical-layer cell ID; or
a globally unique cell ID.

Figure 7:
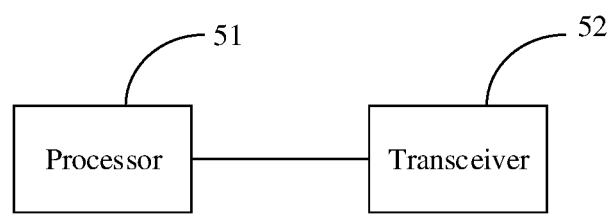
FIG. 7 is a schematic diagram of configuration of an apparatus for recording and reporting information applied to a network-side device according to an embodiment of the disclosure.

An embodiment of the disclosure also provides an apparatus for recording and reporting information, which is applied to a network-side device and, as shown in FIG. 7, a processor 51 and a transceiver 52.

The transceiver 52 is configured to send a random access related information recording instruction to UE. The random access related information recording instruction instructs the UE to record random access related information. The random access related information includes at least one type of the following information to be recorded and reported:
an ID of the beam which sent message A of 2-step random access by the UE;
a number of messages A of 2-step random access sent by the UE;
a size of message A sent by the UE, or a size configured by the network-side device to send message A, or a size of another content except a preamble in message A;
a cause for the UE to switch from 2-step random access to 4-step random access;
an actual value corresponding to a threshold configured by the network-side device for initiating 2-step random access;
time elapsed since the UE switching from 2-step random access to 4-step random access;
the number of attempts of the UE on 2-step random access before switching to 4-step random access, or the maximum number of attempts, configured by the network-side device, of the UE on 2-step random access before the UE backs off to 4-step random access;
information of a serving cell and neighbor cells measured by the UE when determining that 2-step random access does not succeed or fails;
information of the serving cell and the neighbor cells measured by the UE when successfully receiving or decoding message B;
information of the serving cell and the neighbor cells measured by the UE when successfully receiving or decoding message 4;
information of the serving cell and the neighbor cells measured by the UE when successfully receiving or decoding an RAR; or
information of the serving cell and the neighbor cells measured by the UE when successfully receiving or decoding an RRC message.

In the embodiment, the UE may be instructed by the network-side device to record and report related information of 2-step random access or 4-step random access to the network-side device. The network-side device may be helped to configure a reasonable random access related parameter to improve the success rate of random access.

Optionally, the random access related information further includes at least one type of the following information to be recorded and reported:
an ID of the serving cell;
information of the serving cell measured by the UE when sending the preamble; or
information of the neighbor cells measured by the UE when sending the preamble.

Optionally, the transceiver 52 is further configured to receive the random access related information reported by the UE.

The processor 51 is configured to configure a random access parameter according to the random access related information.

Optionally, the transceiver 52 is further configured to send a random access related information reporting instruction to the UE. The random access related information reporting instruction instructs the UE to report the recorded random access related information.

Optionally, the random access related information further includes at least one of geographic position information, time information or speed information corresponding to the information to be recorded and reported.

Optionally, the threshold configured by the network-side device includes at least one of:
RSRP;
RSRQ; or
a SINR.

Optionally, the information of the serving cell includes at least one of:
RSRP of the serving cell;
RSRQ of the serving cell;
a SINR of the serving cell;
an ID of a first beam;
the number of beams with quality higher than a preset threshold value;
RSRP of the first beam;
RSRQ of the first beam; or
a SINR of the first beam.

Optionally, the first beam is any one of:
a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

Optionally, the information of the serving cell measured by the UE includes at least one of:
information of the serving cell measured by the UE when initiating 2-step random access; or
information of the serving cell measured by the UE when initiating 4-step random access; or information of the serving cell measured by the UE when backing off from 2-step random access to 4-step random access.

Optionally, the information of the neighbor cells includes at least one of:
  IDs of the neighbor cells;
  RSRP of the neighbor cells;
  RSRQ of the neighbor cells;
  SINRs of the neighbor cells;
  an ID of a second beam;
  the number of beams with quality higher than a preset threshold value;
  RSRP of the second beam;
  RSRQ of the second beam; or
  a SINR of the second beam.

Optionally, the second beam is any one of:
  beams of the neighbor cells with quality higher than the preset threshold value, measured by the UE; or
  beams of all neighbor cells measured by the UE.

Optionally, the ID of the serving cell or IDs of the neighbor cells includes at least one of:
  a physical-layer cell ID; or
  a globally unique cell ID.

Figure 8:
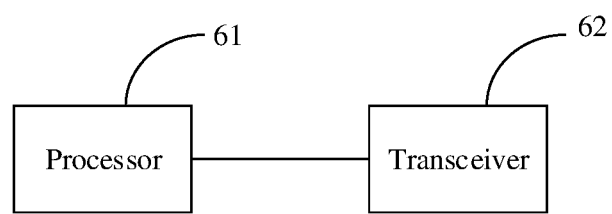
FIG. 8 is a schematic diagram of configuration of an apparatus for recording and reporting information applied to UE according to an embodiment of the disclosure.

An embodiment of the disclosure also provides an apparatus for recording and reporting information, which is applied to UE and, as shown in FIG. 8, a processor 61 and a transceiver 62.

The processor 61 is configured to record random access related information. The random access related information includes at least one type of the following information to be recorded and reported:
  an ID of the beam which sent message A of 2-step random access by the UE;
  a number of messages A of 2-step random access sent by the UE;
  a size of message A sent by the UE, or a size configured by a network-side device to send message A, or a size of another content except a preamble in message A;
  a cause for the UE to switch from 2-step random access to 4-step random access;
  an actual value corresponding to a threshold configured by the network-side device for initiating 2-step random access;
  time elapsed since the UE switching from 2-step random access to 4-step random access;
  the number of attempts of the UE on 2-step random access before switching to 4-step random access, or the maximum number of attempts, configured by the network-side device, of the UE on 2-step random access before the UE backs off to 4-step random access;
  information of a serving cell and neighbor cells measured by the UE when determining that 2-step random access does not succeed or fails;
  information of the serving cell and the neighbor cells measured by the UE when successfully receiving or decoding message B;
  information of the serving cell and the neighbor cells measured by the UE when successfully receiving or decoding message 4;
  information of the serving cell and the neighbor cells measured by the UE when successfully receiving or decoding an RAR; or
  information of the serving cell and the neighbor cells measured by the UE when successfully receiving or decoding an RRC message.

In the embodiment, the UE may be instructed by the network-side device to record and report related information of 2-step random access or 4-step random access to the network-side device. The network-side device may be helped to configure a reasonable random access related parameter to improve the success rate of random access.

Optionally, the random access related information further includes at least one type of the following information to be recorded and reported:
  an ID of the serving cell;
  information of the serving cell measured by the UE when sending the preamble; or
  information of the neighbor cells measured by the UE when sending the preamble.

Optionally, the transceiver 62 is configured to report the random access related information to the network-side device.

Optionally, the transceiver 62 is further configured to receive a random access related information reporting instruction of the network-side device. The random access related information reporting instruction instructs the UE to report the recorded random access related information.

Optionally, the transceiver 62 is configured to execute of any one of:
  reporting the random access related information to the network-side device during a connected state;
  reporting the random access related information to the network-side device during switching to the connected state;
  reporting the random access related information to the network-side device during an idle state;
  reporting the random access related information to the network-side device during an inactive state; or
  reporting the random access related information to the network-side device in a random access report.

Optionally, the random access related information further includes at least one of geographic position information, time information or speed information corresponding to the information to be recorded and reported.

Optionally, the threshold configured by the network-side device includes at least one of:
  RSRP;
  RSRQ; or
  a SINR.

Optionally, the information of the serving cell includes at least one of:
  RSRP of the serving cell;
  RSRQ of the serving cell;
  a SINR of the serving cell;
  an ID of a first beam;
  the number of beams with quality higher than a preset threshold value;
  RSRP of the first beam;
  RSRQ of the first beam; or
  a SINR of the first beam.

Optionally, the first beam is any one of:
  a beam used for message A transmission by the UE or beam corresponding to message A transmission by the UE;
  a beam used for the preamble transmission by the UE or beam corresponding to the preamble transmission by the UE;
  a beam with quality higher than the preset threshold value, measured by the UE; or
  all beams measured by the UE.

Optionally, the information of the serving cell measured by the UE includes at least one of:
  information of the serving cell measured by the UE when initiating 2-step random access; or information of the serving cell measured by the UE when initiating 4-step random access; or information of the serving cell measured by the UE when backing off from 2-step random access to 4-step random access.

Optionally, the information of the neighbor cells includes at least one of:

IDs of the neighbor cells;
RSRP of the neighbor cells;
RSRQ of the neighbor cells;
SINRs of the neighbor cells;
an ID of a second beam;
the number of beams with quality higher than a preset threshold value;
RSRP of the second beam;
RSRQ of the second beam; or
a SINR of the second beam.

Optionally, the second beam is any one of:

beams of the neighbor cells with quality higher than the preset threshold value, measured by the UE; or
beams of all neighbor cells measured by the UE.

Optionally, the ID of the serving cell or IDs of the neighbor cells includes at least one of:

a physical-layer cell ID; or
a globally unique cell ID.

An embodiment of the disclosure also provides a communication device, which includes a memory, a processor and a computer program stored in the memory and capable of running in the processor. The computer program is executed by the processor to implement the steps of the method for recording and reporting informations as described above.

An embodiment of the disclosure also provides a computer-readable storage medium having stored therein a computer program which is executed by a processor to implement the steps of the method for recording and reporting informations as described above.

It can be understood that these embodiments described herein may be implemented by hardware, software, firmware, middleware, a microcode, or a combination thereof. In case of implementation with the hardware, the processing unit may be implemented in one or more Application Specific Integrated Circuits (ASICs), Digital Signal Processors (DSPs), DSP Devices (DSPDs), Programmable Logic Devices (PLDs), Field-Programmable Gate Arrays (FPGAs), general-purpose processors, controllers, microcontrollers, microprocessors, other electronic units configured to execute the functions in the present disclosure, or combinations thereof.

In case of implementation with the software, the technology of the disclosure may be implemented through the modules (for example, processes and functions) executing the functions as described herein. A software code may be stored in the memory and executed by the processor. The memory may be implemented in or outside the processor.

Each embodiment in the specification is described progressively. Descriptions made in each embodiment focus on differences from the other embodiments. The same or similar parts in each embodiment refer to the other embodiments.

Those skilled in the art should know that the embodiment of the disclosure may be provided as a method, an apparatus, or a computer program product. Therefore, the embodiment of the disclosure may use form of a pure hardware embodiment, a pure software embodiment, or an embodiment combining software and hardware. Moreover, the embodiment of the disclosure may use form of a computer program product implemented on one or more computer-available storage media (including, but not limited to, a disk memory, a Compact Disc Read-Only Memory (CD-ROM), and an optical memory) including computer-available program codes.

The embodiments of the disclosure are described with reference to flowcharts and/or block diagrams of the method, UE (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing UE to generate a machine, so that a device for realizing a function specified in one flow or multiple flows in the flowcharts and/or one block or multiple blocks in the block diagrams is generated by the instructions executed through the computer or the processor of the other programmable data processing UE.

Alternatively, these computer program instructions may be stored in a computer-readable memory capable of guiding the computer or the other programmable data processing UE to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

Alternatively, these computer program instructions may be loaded onto the computer or the other programmable data processing UE, so that a series of operating steps are executed on the computer or the other programmable data processing UE to generate processing implemented by the computer, and steps for realizing the function specified in one flow or multiple flows in the flowcharts and/or one block or multiple blocks in the block diagrams are provided by the instructions executed on the computer or the other programmable data processing UE.

Although optional embodiments of the embodiments of the disclosure have been described, those skilled in the art, once learning about basic creative concepts, may make other variations and modifications to these embodiments. Therefore, it is intended that the appended claims are explained to include the optional embodiments and all the variations and modifications falling within the scope of the embodiments of the disclosure.

It is also to be noted that relational terms such as first and second herein are used only to distinguish an entity or operation from another entity or operation and does not always require or imply the existence of any practical relation or sequence between these entities or operations. Moreover, terms "include" and "contain" or any other variation thereof is intended to cover nonexclusive inclusions, so that a process, method, object or UE including a series of elements not only includes those elements, but also includes other elements which are not clearly listed, or further includes elements intrinsic to the process, the method, the object or the UE. Without more restrictions, an element defined by statement "including a/an . . . " does not exclude the existence of the same other elements in a process, method, object or UE including the element.

The above is the optional implementation mode of the disclosure. It is to be pointed out that those ordinary skilled in the art may further make a plurality of improvements and embellishments without departing from the principle of the disclosure, and these improvements and embellishments shall fall within the scope of protection of the disclosure.

The invention claimed is:

1. A method for recording and reporting information, applied to a network-side device and comprising:
sending a random access related information recording instruction to User Equipment (UE), the random access related information recording instruction indicating the UE to record random access related information, wherein the random access related information comprises at least one type of the following information to be recorded and reported:
an actual value corresponding to a threshold configured by the network-side device for initiating 2-step random access; or
a maximum number of attempts, configured by the network-side device, of the UE on 2-step random access before the UE backs off to 4-step random access;
wherein the threshold configured by the network-side device comprises at least one of:
Reference Signal Received Power (RSRP);
Reference Signal Received Quality (RSRQ); or
a Signal to Interference plus Noise Ratio (SINR).

2. The method for recording and reporting information of claim 1, wherein the random access related information further comprises at least one type of the following information to be recorded and reported:
an Identifier (ID) of a serving cell;
information of the serving cell measured by the UE when sending a preamble; or
information of neighbor cells measured by the UE when sending the preamble.

3. The method for recording and reporting information of claim 2, wherein the information of the serving cell measured by the UE when sending the preamble comprises at least one of:
RSRP of the serving cell;
RSRQ of the serving cell;
SINR of the serving cell;
an ID of a first beam;
a number of beams with quality higher than a preset threshold value;
RSRP of the first beam;
RSRQ of the first beam; or
SINR of the first beam,
wherein the first beam is any one of:
a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

4. The method for recording and reporting information of claim 1, wherein after the sending a random access related information recording instruction to UE, the method further comprises:
receiving the random access related information reported by the UE; and
configuring a random access parameter according to the random access related information,
wherein before the receiving the random access related information reported by the UE, the method further comprises:
sending a random access related information reporting instruction to the UE, the random access related information reporting instruction indicating the UE to report the recorded random access related information.

5. The method for recording and reporting information of claim 1, wherein the random access related information further comprises at least one of geographic position information, time information or speed information corresponding to the information to be recorded and reported.

6. A communication device, comprising a memory, a processor and a computer program which is stored in the memory and executable by the processor, wherein the computer program is executed by the processor to implement the steps of the method for recording and reporting information of claim 1.

7. A method for recording and reporting information, applied to User Equipment (UE) and comprising:
recording random access related information, the random access related information comprising at least one of:
an actual value corresponding to a threshold configured by a network-side device for initiating 2-step random access; or
a maximum number of attempts, configured by the network-side device, of the UE on 2-step random access before the UE backs off to 4-step random access;
wherein the threshold configured by the network-side device comprises at least one of:
Reference Signal Received Power (RSRP);
Reference Signal Received Quality (RSRQ); or
Signal to Interference plus Noise Ratio (SINR).

8. The method for recording and reporting information of claim 7, wherein the random access related information further comprises at least one of:
an Identifier (ID) of a serving cell;
information of the serving cell measured by the UE when sending a preamble; or
information of neighbor cells measured by the UE when sending the preamble.

9. The method for recording and reporting information of claim 8, wherein the information of the serving cell measured by the UE when sending the preamble comprises at least one of:
RSRP of the serving cell;
RSRQ of the serving cell;
SINR of the serving cell;
an ID of a first beam;
a number of beams with quality higher than a preset threshold value;
RSRP of the first beam;
RSRQ of the first beam; or
SINR of the first beam,
wherein the first beam is any one of:
a beam used for message A transmission by the UE or beam corresponding to message A transmission by the UE;
a beam used for the preamble transmission by the UE or beam corresponding to the preamble transmission by the UE;
a beam with quality higher than the preset threshold value, measured by the UE; or
all beams measured by the UE.

10. The method for recording and reporting information of claim 7, wherein after the recording random access related information, the method further comprises:
reporting the random access related information to the network-side device, wherein before the recording random access related information, the method further comprises:
receiving a random access related information recording instruction from the network-side device, the random access related information recording instruction indicating the UE to record the random access related information.

11. The method for recording and reporting information of claim 7, wherein the random access related information further comprises at least one of geographic position information, time information or speed information corresponding to information to be recorded and reported.

12. An apparatus for recording and reporting information, applied to User Equipment (UE) and comprising a processor and a transceiver, wherein
the processor is configured to record random access related information, the random access related information comprising at least one of:
an actual value corresponding to a threshold configured by a network-side device for initiating 2-step random access; or
a maximum number of attempts, configured by the network-side device, of the UE on 2-step random access before the UE backs off to 4-step random access;
wherein the threshold configured by the network-side device comprises at least one of:
Reference Signal Received Power (RSRP);
Reference Signal Received Quality (RSRQ); or
a Signal to Interference plus Noise Ratio (SINR).

* * * * *